United States Patent Office 3,749,685
Patented July 31, 1973

3,749,685
MICROPOROUS VINYL CHLORIDE POLYMERS AND PROCESS FOR PRODUCING
William R. Johnson, Jr., Richmond, Va., and Leonard M. Davis, Jr., Poughkeepsie, N.Y., assignors to Philip Morris Incorporated, New York, N.Y.
No Drawing. Continuation of application Ser. No. 26,763, Apr. 8, 1970. This application Jan. 26, 1972, Ser. No. 221,111
Int. Cl. C08f 47/08, 29/18; A24d 1/06
U.S. Cl. 260—2.5 M     5 Claims

ABSTRACT OF THE DISCLOSURE

This disclosure relates to a novel process and to novel products. The products comprise a vinyl chloride polymer having an improved microreticulated structure and are made by a process which comprises forming a dispersion of vinyl chloride polymer particles in water containing a water-soluble thickening agent, preferably deaerating the dispersion under reduced pressure and heating of the dispersion to sinter the vinyl chloride polymer particles and to form a microreticulated, microporous structure. The products of this invention are particularly useful as filter materials, especially as cigarette filters; and the process of the invention is especially suited for the formation of shaped porous articles which are useful as filters.

---

This is a continuation of application Ser. No. 26,763, filed Apr. 8, 1970 and now abandoned.

It is known to prepare a polymer resin having a microporous microreticulated structure by sintering a mixture of a thermoplastic synthetic resin such as polyvinyl chloride, a plasticizer for the resin, for example dioctyl phthalate, and an organic liquid non-solvent for the resin, for example xylene, to a temperature at which the resin fuses while under a pressure sufficient to maintain the liquid in a liquid phase until a microreticulated structure is formed and thereafter removing most of the non-solvent by reducing the pressure and heating. Such a product and process are described in U.S. Pats. Nos. 2,777,824 and 3,055,297 for use in printing operations. However, such products do not always have a desired degree of uniformity and are not well adapted for use as filter materials.

Microporous microreticulated polymer may also be prepared, particularly for use as cigarette filters, by heating together a thermoplastic synthetic resin, such as polyvinyl chloride, and certain organic liquid non-solvent liquids for the resin to a temperature at which the resin fuses and under a pressure sufficient to maintain the non-solvent liquid in the liquid phase. The mixture may optionally contain a plasticizer. The non-solvent, for example Decalin or dodecane, and plasticizer, when employed, are removed or extracted after fusion by exposing the fused resin to vapors of a heated second liquid, such as lower alcohols or water. This product and process, disclosed in application Ser. No. 714,762, filed on Mar. 21, 1968 of W. R. Johnson, J. S. Osmalov and R. N. Thomson, provide a material which is friable and capable of being readily broken or ground to small size while retaining its microreticulated porous structure and which is particularly suitable for cigarette filters. However, the dispersion of thermoplastic resin and non-solvent, from which the abovementioned microreticulated polymer is made, may be somewhat heat sensitive and are subject to thermal gradients, shrinkage and other factors which may result in some non-uniformity. This may not be a serious problem when the product is to be crushed and/or employed in a powdery or granular form. However, when the intended use requires that the product be molded or formed into a desired and particular shape, these conditions are far less tolerable. Where plasticizers are present in the dispersion in addition to the non-solvent, the product is soft and flexible. Such a product is not useful in many of the applications of the present invention unless plasticizer is subsequently extracted by the use of carefully chosen solvent. Furthermore, the plasticizer tends to cause non-uniformity in the product, such as in the formation of an impermeable outer sheath.

We have discovered that a uniform and microreticulated microporous vinyl chloride polymer may be made which can be formed or molded into certain shapes suitable for various uses by the use of water and a selected thickener to form a vinyl chloride polymer dispersion and by an improved process that includes a reduced pressure deaeration of the vinyl chloride polymer dispersion.

Accordingly, this invention relates to a novel process and novel products. The products comprise a vinyl chloride polymer having an improved microreticulated structure and are made by a process involving the formation of a dispersion of vinyl chloride polymer particles in water and a selected thickener, preferably reduced pressure deaeration of the dispersion, and heating of the dispersion, preferably deaerated, to sinter the vinyl chloride polymer particles to form a microreticulated microporous structure. The products of this invention are particularly useful as filter materials and the process of the invention is especially suited for the formation of shaped porous articles, useful as filters.

A preferred aspect of the present invention involves the formation of a shaped vinyl chloride polymer product comprising a vinyl chloride resin having a microporous structure comprising interconnected aggregates of united vinyl chloride polymer particles, the aggregates defining a reticular capillary pore system extending from surface to surface of the structure.

According to the present invention, the process for preparing microreticulated microporous vinyl chloride polymer product, particularly shaped products, wherein a dispersion comprising a finely divided vinyl chloride resin and a non-solvent for the resin is sintered at a temperature at which the resin fuses, for example in a mold or form, and the non-solvent is extracted or removed, is improved by forming an aqueous dispersion of vinyl chloride polymer particles in a non-solvent comprising water and a thickener. Subjecting the dispersion to deaeration at a pressure of less than 10 mm. of mercury prior to sintering provides even greater improvement and constitutes a most preferred form of this invention.

The uses for which products of the present invention are suitable include the use of shaped articles formed by the present process as filters, gas diffusers, metering barriers and the like. In addition, the products can be used in various shapes or can be ground or comminuted to form materials which are particularly useful as tobacco smoke filters, for example as cigarette filters.

The vinyl chloride resin employed in accordance with the present invention may be polyvinyl chloride or may be a vinyl chloride copolymer, for example, copolymers of vinyl chloride and vinyl acetate, copolymers of vinyl chloride and propylene, copolymers of vinyl chloride and alkyl esters of maleic acid, or a terpolymer prepared from three monomers or compatible blends, such as blends of polyvinyl chloride and polymers of esters of acrylic and methacrylic acids. Preferably, said copolymers contain at least 50% vinyl chloride.

The polyvinyl chloride resin particles may constitute from about 5 to about 40% by weight of the aqueous dispersion, but preferably, should constitute from about 10 to 30% by weight of the dispersion and the resin may be employed in a particle size of from about 0.05 to about 100 microns, but should preferably be employed in a particle size of from about 0.1 to about 20 mcirons in average diameter when dispersed in the non-solvent.

The thickener may comprise from about 0.05 to about 10% by weight of the dispersion and may consist of a dextrin, starch, or starch derivative, a natural water-soluble gum, or a water-soluble synthetic polymer which is attached by high humidity. Natural gums useful as film formers include guar gum, gum arabic, tragacanth and pectins. Synthetic resins or polymers useful in the present invention are exemplified by solid polyethylene glycols, polyvinyl alcohols, polyethylene oxides, polyacrylic acids and their salts, and polymers of polyvinylpyrrolidone. Various blends of these materials, used in various molecular weights, may also be used.

Preferred materials are the water-soluble polyalkylene oxides and polyvinyl alcohols.

The polyalkylene oxides which may be employed in accordance with the present invention may have molecular weights of from about 70,000 to about 15,000,000. Even greater moleular weights can be employed. However, the preferred molecular weight of the polyethylene oxide is from about 1,000,000 to about 5,000,000.

The polyalkylene oxide may be prepared using polyethylene oxide or a copolymer of ethylene oxide with less than 50% by weight of propylene oxide, i.e., oxides containing both $—C_2H_4O—$ and $—C_3H_6O—$ groups, and may be also mono- or di-esters of such polyalkylene oxides, for example, the methoxy esters of polyethylene oxides. As used herein, the term "polyalkylene oxide" is intended to include all such materials, including the esters, having molecular weights of from about 70,000 to about 5,000,000 and higher, extending as high as 15,000,000 and above.

Illustrative of such materials are polyethylene oxides which have the general formula:

$$HO(—C_2H_4—O—)_x$$

wherein $x$ is an integer having a value of from about 1,600 to about 115,000 and higher to correspond to the disclosure set forth above. Such materials may be prepared, generally, by polymerizing alkylene oxides by conventional methods. For example, ethylene oxide can be reacted in accordance with the following equations to yield the polymer:

(1) 
$$CH_2—CH_2 + H_2O \longrightarrow HO—CH_2—CH_2—OH$$

(2) 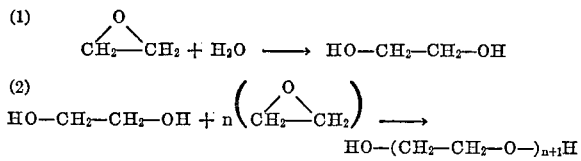
$$HO—CH_2—CH_2—OH + n\left(CH_2—CH_2\right) \longrightarrow$$
$$HO—(CH_2—CH_2—O—)_{n+1}H$$

Particularly preferred polyalkylene oxides are water-soluble solid polyethylene oxide and copolymers containing at least 50 weight percent of ethylene oxide in copolymerized form with up to 50 weight percent of a second lower olefin oxide, for example, propylene oxide, butylene oxide, and the like.

In a most preferred embodiment of the present invention, polyethylene oxide and/or the above-defined copolymers should have a reduced viscosity value in the range of from about 1.0 to about 75 to even higher, and most preferably should have a reduced viscosity of from about 2 to about 60. Reduced viscosity is an indirect measurement of the molecular weight of the polymer and it is a value obtained by dividing the specific viscosity by the concentration of the alkylene oxide polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosities herein referred to are measured at a concentration of 0.2 gram of polyalkylene oxide in 100 milliliters of acetonitrile at 30° C.

Solid alkylene oxide polymers can be prepared by polymerizing an alkylene oxide in the presence of certain metal carbonate catalysts, such as calcium carbonate, barium carbonate, strontium carbonate and the like. These metal carbonate catalysts can be employed in concentrations in the range from about 0.3 to 3 parts by weight per 100 parts by weight of alkylene oxide. The polymerization reaction can be conducted in the liquid phase at a temperature in the range from about 70° C. to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is also preferred that the carbonate catalyst be free from ions which reduced their catalyst activity such as, for example, chlorate and thiosulfate ions. Additional details regarding the production of polyalkylene oxide can be found in the disclosure in U.S. Pat. 3,032,445 and the disclosure in the United States applications which are referred to therein.

According to the process of the present invention, the dispersion of the vinyl chloride resin particles in the water and thickener is formed by stirring or low shear mixing. Preferably, the dispersion is formed by low shear mixing for a period of from about 2 to about 5 minutes. The dispersion is then preferably deaerated by subjecting it to a pressure below about 10 mm. mercury, preferably below about 2 mm. mercury. In this manner, air on the particles or entrapped within agglomerates is removed along with volatiles. The dispersion may then be placed in a form or mold having a desired shape and heated until sintering occurs. Sintering is accomplished at a temperature of from about 120° C. to about 190° C., preferably from about 150° C. to 170° C. for a period of from about 20 to about 80 minutes and preferably from about 30 to about 70 minutes.

The shaped product is then cooled. The cooled product may be chopped, sliced or comminuted in various ways and may be washed with water, lower alcohols or the like and thereafter dried. It may then be ground and sieved to —40 x +80 mesh or the like and employed as a filter material for incorporation in cigarettes and other smoking products.

The shaped microporous product of the present invention may have certain fillers incorporated in the dispersion with the synthetic resin. Such fillers may include fine clays, powdered polymers other than the base polymer, such as polyvinyl acetate or polyethylene, or fine activated charcoal. A particularly preferred filler is sub-micron sized positively charged particles, such as "Alon" alumina aerogel, a product of the Cabot Corporation. Electrically conductive graphite is also of interest as a filler. The filler, when employed, usually will be present in an amount of from about 5% to about 60% by weight of the dispersion.

Representative of other additives which may be incorporated in the microporous structure of this invention are plasticizers, bacteriostats, metals, catalysts, pigments and magnetic powders, as well as stabilizers for the resin.

The following examples are illustrative:

EXAMPLE 1

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of a copolymer of 95% vinyl chloride and 5% vinyl acetate (sold under the trade name "Geon" 135 by B. F. Goodrich Co.), 10 grams glycerine and 10 grams of polyethylene powder (sold under the trade name "Microthene" FN–500 by U.S.I. Chemical Co.) with moderate stirring, to form a dispersion of the copolymer. The resulting dispersion was subjected to a vacuum of 1 mm. Hg for a period of 120 minutes, in order to deaerate the same. The resulting dipersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into cubes of approximately 0.25 inch on a side, slurried in water, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in micron) was 5 to 30. The average pore diameter (in microns) was 13.

The sample was evaluated as a cigarette filter, by filling the space of a plug-space-plug filter, wherein the plugs were 5 mm. in length and the space was 15 mm. in length and the plugs were cellulose acetate tow plugs. The RTD* of the filter was 3 inches.

The filter was attached to a 60 mm. standard cigarette rod and smoked by machine in accordance with a standard method. The weight of the resin was found to be 75 mg. and the TPM efficiencies were found to be 75%.

EXAMPLE 2

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of a copolymer of 95% vinyl chloride and 5% vinyl acetate (sold under the trade name "Geon" 135 by B. F. Goodrich Co.), 10 grams glycerine and 10 grams of polyethylene powder (sold under the trade name "Microthene" FN–500 by U.S.I. Chemical Co.) with moderate stirring, to form a dispersion of the copolymer. The resulting dispersion was subjected to a vacuum of 1 mm. Hg for a period of 120 minutes, in order to deaerate the same. The resulting dispersions was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into approximately 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–30. The average pore diameter (in microns) was 13.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 72%.

EXAMPLE 3

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of polyvinyl chloride (sold under the trade name "Geon" 126

---

*Resistance to draw, also referred to in this specification as RTD, was determined as follows:

A vacuum system was set to puff an air flow of 1050 cc./min. by inserting the tapered end of a standard capillary tube through the dental dam of the cigarette holder and adjusting the reading on the water manometer to the correct RTD. The water level of the manometer was set at zero before inserting the standard capillary.
The butt end of the cigarette was then inserted to a depth of 5 mm. in the dental dam of the cigarette holder. The pressure drop behind this cigarette with 1050 cc./min. of air flow passing through was read directly as RTD (inches water) from the inclined water manometer.

--- by B. F. Goodrich Co.), 10 grams glycerine and 10 grams of polyethylene powder (sold under the trade name "Microthene" FN–500 by U.S.I. Chemical Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 5–30. The average pore diameter (in microns) was 14.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 60 mg. and the TPM efficiencies were found to be 72%.

EXAMPLE 4

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of polyvinyl chloride (sold under the trade name "Geon" 126 by B. F. Goodrich Co.), 10 grams glycerine and 10 grams of polyethylene powder (sold under the trade name "Microthene" FN–500 by U.S.I. Chemical Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in water, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 5–13. The average pore diameter (in microns) was 14.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 64%.

EXAMPLE 5

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of a copolymer of 95% vinyl chloride and 5% vinyl acetate (sold under the trade name "Geon" 135F–1 by B. F. Goodrich Co.), 10 grams glycerine and 10 grams of polyethylene powder (sold under the trade name "Microthene" FN–500 by U.S.I. Chemical Co.) with moderate stirring, to form a dispersion of the copolymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting produce was then cooled to room temperature, removed from the tube, chopped into 0.25 inch cubes, slurried in isopropyl alcohol, dried at a temperature of 60° C. and a pressure of 1 mm. Hg, ground and sieved to —40 x +80 mesh.

The product was examined microscopically, to obtain average pore size and pore range and to observe its microstructure. The pore diameter range (in microns) was 3–30. The average pore diameter (in microns) was 14.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 58%.

EXAMPLE 6

2 grams of a thickener, a polyvinyl alcohol sold under the trade name "Vinol" 351 by Airco Chemicals & Plastics was dissolved in 200 grams of tap water, with stirring at a low shear rate. To this solution was added 40 grams of polyvinyl chloride (sold under the trade name "Geon" 126 by B. F. Goodrich Co.), 10 grams glycerine and 10 grams of polyethylene powder (sold under the trade name "Microthene" FN–500 by U.S.I. Chemical Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to —40 x +80 mesh.

The product was examined microscopically, to obtain average pore size and pore range and to observe its microstructure. The pore diameter range (in microns) was 3–30. The average pore diameter (in microns) was 12.

The sample was evaluated as a cigarette filter, by filling the space of a plug-space-plug filter, wherein the plugs were 5 mm. in length and the space was 15 mm. in length an the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 46%.

EXAMPLE 7

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) and 10 grams glycerine with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to —40 x +80 mesh.

The product was examined microscopically, to obtain average pore size and pore range and to observe its microstructure. The pore diameter range (in microns) was 5 to 30. The average pore diameter (in microns) was 12.7.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 55%.

EXAMPLE 8

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to —40 x +80 mesh.

The product was examined microscopically, to obtain average pore size and pore range and to observe its microstructure. The pore diameter range (in microns) was 3–30. The average pore diameter (in microns) was 13.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 61%.

EXAMPLE 9

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 40 grams of polyvinyl chloride (sold under the trade name "Geon" 126 by B. F. Goodrich Co.), and 10 grams of polyethylene powder (sold under the trade name "Microthene" FN–500 by U.S.I. Chemical Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was, maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–30. The average pore diameter (in microns) was 13.0.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 70 mg. and the TPM efficiencies were found to be 70%.

EXAMPLE 10

2 grams of a thickener, a polyethylene oxide, having a molecular weight of 150,000 (sold under the trade name "Polyox" WSRN–80 by Union Carbide Corporation) was dissolved in 200 grams of tap water, with stirring at a low shear rate. To this solution was added 40 grams of polyvinyl chloride (sold under the trade name "Geon" 126 by B. F. Goodrich Co.), and 10 grams of polyethylene powder (sold under the trade name "Microthene" FN–500 by U.S.I. Chemical Co.) with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 5–100. The average pore diameter (in microns) was 27.5.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 46%.

EXAMPLE 11

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) and 10 grams glycerine with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–30. The average pore diameter (in microns) was 9.7.

The sample was evaluated at a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 72%.

EXAMPLE 12

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) and 10 grams glycerine with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, grounded and sieved to −40 x +80 mesh.

The product was examined microscopically, to obtain average pore size and pore range and to observe its microstructure. The pore diameter range (in microns) was 3–30. The average pore diameter (in microns) was 12.8.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 61%.

EXAMPLE 13

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) and 10 grams glycerine with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–40. The average pore diameter (in microns) was 14.4.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 71%.

EXAMPLE 14

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) with moderate stirring, to form a dispersion of the polymer. The resulting dispersion was subjected to a vacuum of 1 mm. for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–40. The average pore diameter (in microns) was 14.

The sample was evaluated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 68%.

EXAMPLE 15

½ gram of a thickener, a polyethylene oxide, having a molecular weight of 5,000,000 (sold under the trade name "Polyox" coagulant by Union Carbide Corporation) was dissolved in 200 grams of tap water, with stirring at a low shear rate. To this solution was added 50 grams of polyvinyl chloride (sold under the trade name "Geon" 126 by B. F. Goodrich Co.) and 10 grams glycerine with moderate stirring, to form a dispersion of the polymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–40. The average pore diameter (in microns) was 14.

The sample was elevated as a cigarette filter, by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 73%.

EXAMPLE 16

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of a copolymer of 95% vinyl chloride and 5% vinyl acetate (sold under the trade name "Geon" 135 by B. F. Goodrich Co.) and 10 grams glycerine with moderate stirring, to form a dispersion of the copolymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–50. The average pore diameter (in microns) was 13.

The sample was evaluated as a cigarette filter by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 69%.

EXAMPLE 17

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of a copolymer of 95% vinyl chloride and 5% vinyl acetate (sold under the trade name "Geon" 135 by B. F. Goodrich Co.) and 10 grams glycerine with moderate stirring, to form a dispersion of the copolymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to −40 x +80 mesh.

The product was examined microscopically, to obtain average pore size and pore range and to observe its microstructure. The pore diameter range (in microns) was 3–60. The average pore diameter (in microns) was 13.0.

The sample was evaluated as a cigarette filter by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 68%.

EXAMPLE 18

2 grams of a thickener, a polyethylene oxide, having a molecular weight of 4,000,000 (sold under the trade name "Polyox" WSR–301 by Union Carbide Corporation) was dissolved in 200 grams of tap water, with stirring at a low shear rate. To this solution was added 50 grams of a copolymer of 95% vinyl chloride and 5% vinyl acetate (sold under the trade name "Geon" 135 by B. F. Goodrich Co.) and 10 grams glycerine with moderate stirring to form a dispersion of the copolymer. The resulting dispersion was subjected to a vacuum of 1 mm. Hg for a period of 120 minutes, in order to deaerate the same. The resulting dispersion was then transferred to a Carius tube of 1 inch in internal diameter, the tube was capped and then heated in a forced draft oven which was maintained at a temperature of 163° C. to 165° C. for a period of 53 minutes. The resulting product was then cooled to room temperature, removed from the tube, chopped into 0.25 inch cubes, slurried in isopropyl alcohol, dried at a temperature of 60° C. and a pressure of 1 mm. Hg, ground and sieved to $-40$ x $+80$ mesh.

The product was examined microscopically, to obtain average pore size and pore range and to observe its microstructure. The pore diameter range (in microns) was 3–60. The average pore diameter (in microns) was 13.0.

The sample was evaluated as a cigarette filter by filling the space of a plug-space-plug filter, wherein the plugs were 5 mm. in length and the space was 15 mm. in length and the plugs were cellulose acetate tow plugs. The RTD of the filter was 3 inches.

The filter was attached to a 60 mm. standard cigarette rod and smoked by machine in accordance with a standard method. The weight of the resin was found to be 75 mg. and the TPM efficiencies were found to be 65%.

We claim:

1. A process for preparing a friable, microporous product, comprising forming a dispersion of a water-soluble thickener, a finely divided vinyl chloride polymer, and water as a non-solvent for the polymer by low shear mixing of about 0.05 to about 10% by weight of said thickener and about 5 to about 40% by weight of polymer particles, the remainder being water, deaerating said dispersion at a pressure below about 10 mm. mercury to remove air, sintering the deaerated polymer dispersion at a temperature of about 120° C. to about 190° C. for 20 to 80 minutes in order to fuse the polymer particles into a friable, microporous product, washing the product with a liquid non-solvent for the resin, and then comminuting the product to granular form.

2. The process of claim 1, wherein said thickener is polyethylene oxide.

3. The process of claim 1, wherein said finely divided vinyl chloride polymer is dispersed as particles having an average diameter of from about 0.05 to about 100 microns.

4. The process of claim 1, wherein said product is comminuted to a size of from $-40$ to $+80$ mesh.

5. The process of claim 4, wherein said thickener is polyethylene oxide.

References Cited

UNITED STATES PATENTS

| | | | |
|---|---|---|---|
| 3,528,433 | 9/1970 | Johnson et al. | 131—269 |
| 3,674,722 | 7/1972 | Rainer et al. | 260—2.5 |
| 2,806,256 | 9/1957 | Smith-Johannsen | 260—2.5 |
| 3,551,538 | 12/1970 | Yamamoto et al. | 260—2.5 |
| 3,297,595 | 1/1967 | Mindick et al. | 260—2.5 |

JOHN C. BLEUTGE, Primary Examiner

W. J. BRIGGS, SR., Assistant Examiner

U.S. Cl. X.R.

131—10 R; 260—17.4 R, ST, SG, 29.6 NR, WA, 92.8 A, 87.5 R, 895, 899; 264—41